(12) United States Patent
Doyen et al.

(10) Patent No.: US 7,862,718 B2
(45) Date of Patent: Jan. 4, 2011

(54) INTEGRATED PERMEATE CHANNEL MEMBRANE

(75) Inventors: Wim Doyen, Wommelgem (BE); Herman Beckers, Scherpenheuvel-Zichem (BE); Walter Adriansens, Mol (BE); Chris Dotremont, Kessel-Lo (BE)

(73) Assignee: Vlaamse Instelling Voor Technologisch Onderzoek (VITO), Mol (BE)

( * ) Notice: Subject to any disclaimer, the term of this patent is extended or adjusted under 35 U.S.C. 154(b) by 722 days.

(21) Appl. No.: 11/659,906

(22) PCT Filed: Aug. 10, 2005

(86) PCT No.: PCT/BE2005/000127

§ 371 (c)(1),
(2), (4) Date: Oct. 15, 2007

(87) PCT Pub. No.: WO2006/015461

PCT Pub. Date: Feb. 16, 2006

(65) Prior Publication Data

US 2008/0164208 A1    Jul. 10, 2008

(30) Foreign Application Priority Data

Aug. 11, 2004  (EP) ................................ 04447188

(51) Int. Cl.
*B01D 63/08* (2006.01)
*B01D 63/10* (2006.01)
*B01D 61/00* (2006.01)

(52) U.S. Cl. .............. 210/321.6; 210/321.83; 210/321.84; 210/321.85

(58) Field of Classification Search ............... None
See application file for complete search history.

(56) References Cited

U.S. PATENT DOCUMENTS

| 4,476,022 | A | * | 10/1984 | Doll ..................... 210/321.83 |
| 4,769,263 | A | | 9/1988 | Bitter |
| 5,275,725 | A | | 1/1994 | Ishii et al. |
| 5,888,275 | A | | 3/1999 | Hamasaki et al. |
| 2004/0045892 | A1 | * | 3/2004 | De La Cruz .......... 210/321.74 |

FOREIGN PATENT DOCUMENTS

| EP | 0 653 240 A1 | 5/1995 |
| EP | 1 022 052 A2 | 7/2000 |
| EP | 1 059 114 A2 | 12/2000 |
| JP | 60-238103 | 11/1985 |
| JP | 9-141067 | 6/1997 |
| JP | 11-244672 | 9/1999 |

(Continued)

*Primary Examiner*—Krishnan S. Menon
(74) *Attorney, Agent, or Firm*—Merchant & Gould P.C.

(57) ABSTRACT

A membrane has a permeate channel including a 3D spacer fabric having an upper and a lower fabric surface (2,3) spaced apart by monofilament thread (4) at a predefined distance, the permeate channel being interposed between two membrane layers (12, 13), wherein the membrane layers are linked at a multitude of points with the upper and lower fabric surfaces to form an integral structure with a high bonding strength suitable for backflush operations. A method provides an integrated permeate channel membrane, including the steps of: —Providing a 3D spacer fabric having an upper and lower surface fabric (2,3) spaced apart by monofilament thread (4) at a predefined distance; and—Applying a membrane layer to both the upper and the lower surface fabric.

18 Claims, 4 Drawing Sheets

FOREIGN PATENT DOCUMENTS

| | | |
|---|---|---|
| JP | 2001-212436 | 8/2001 |
| JP | 2001-321645 | 11/2001 |
| JP | 2002-95931 | 4/2002 |
| JP | 2003-135939 | 5/2003 |
| JP | 2003-144869 | 5/2003 |
| JP | 2003-251154 | 9/2003 |
| WO | 98/01219 | 1/1998 |
| WO | 03/037489 A1 | 5/2003 |

\* cited by examiner

Fig. 12

INTEGRATED PERMEATE CHANNEL MEMBRANE

FIELD OF THE INVENTION

The present invention is related to a novel membrane containing an integrated permeate channel, particularly useful for membrane technology in e.g. water filtration and wastewater purification.

STATE OF THE ART

Membrane bioreactors (MBRs) have been a popular subject in the water-world during the past years. Until now research has covered the applicability of MBRs at wastewater treatment plants as well as concentrated flows from industrial production processes, the treatment of percolate water from waste disposal sites and the dewatering of sludge. In sequence to the success of membrane bioreactors for wastewater applications, a study was performed on the subject of applying MBR concepts in the drinking water production process.

MBRs in wastewater applications consist of a combination of biological treatment in a reactor and physical treatment by a membrane filtration step. By introducing membrane filtration instead of a settling process, high sludge loads can be maintained in the reactor, which (theoretically) lead to high biological degradation rates with a low sludge production. Sludge concentrations of 15-20 g/l are mentioned in literature on MBRs. The high efficiency of the process would make it possible to process highly concentrated flows and to design systems with a small footprint. In practice however, the footprint is only reduced by the smaller area required for the membrane filtration due to a maximal maintainable sludge concentration of 8-12 g/l. In addition higher sludge production rates have been registered than in conventional settlement systems.

JP2001212436 describes an immersion type membrane cartridge and production method therefore. In this application, an immersion type membrane cartridge is manufactured, wherein the membranes are welded to the inside margin of the filter cartridge.

JP2003135939 and JP2003144869 describe a separation membrane and manufacturing method therefore. The separation membrane is manufactured by forming the porous resin layer on the surface of the porous base material composed of an organic fiber. A part of the resin is infiltrated into at least the surface layer part of the porous base material to form a composite layer with the porous base material at least in the surface layer part.

The aim of these patents is to develop a membrane with high water permeability, in which clogging hardly occurs and the stripping of the porous resin layer from a porous base material is prevented.

In JP201321645, a filter membrane element is presented. The filter element has a gap for water collection penetrating both surfaces of the support plate on a portion of the support plate; and a gap for water collection is arranged in the direction of a takeout port of the permeated water and is in communication with the takeout port of the permeated water WO 03037489 describes a plate filtration module, said module comprising a plurality of "filter membrane pockets" having at least one opening for draining the inner region of the same. Said pockets are vertically arranged in a rigid supporting element in a parallel manner, preferably at the same distance from each other, in such a way that the adjacent filter membrane pockets can intensively crossed by liquid. The filtration module is characterized in that the filter membrane pockets are essentially flat and flexible and are fixed to the supporting element on opposite sides, said supporting element comprising at least one evacuation line for evacuating the liquid which is sucked out via the filter membrane pockets having a flexible, liquid permeable core and a plurality of liquid permeable core elements.

JP11244672 describes a flat membrane element wherein sealing parts are formed by tightly adhering the peripheral marginal three sides at the top end and both right and left ends thereof to constitute a quadrilateral flat planar membrane formed as a bag form. The one side at the unsealed peripheral edge of the flat planar membrane installed with the membrane supporting member is superposed by about 1.5 cm in height on the surface on both sides of the upper part of the membrane supporting member and is welded to the membrane supporting member to support the flat planar membrane. The heads larger in the thickness than the membrane supporting member are formed at both ends of the membrane supporting member. Both of the heads are provided with nozzles which are in communication with the flow passages of the membrane supporting member and are used to take out the permeate.

The membrane plates (filter pockets, bag from quadrilateral flat planar membrane) of the prior art are formed by bringing together the separate constituents (two membranes, spacer and support). The two membranes are placed with their membrane supports directed to each other, and a spacer placed in between them for creating a gap. The weak points of these concepts are:

- Construction of permeate channel with the separate constituents. A lot of operational steps for construction (gluing, sticking, welding) compromising to a large extent the module integrity (leaks) and its cost price.
- Adhesion of membrane to the module support (detachment, stripping of the membrane!).
- Operational problem: impossibility of back-washing the membranes, due to poor adhesion of the membranes to their support.

Spiral wound NF/RO technology consists of retrofittable standardized membrane module elements (8-inch diameter, 40 to 60 inches long) which are placed in standardized pressure vessels (8-inch diameter with lengths of up to 240 inch long).

For the production of such spiral-wound membrane modules, normally a plurality of independent envelope-like membranes (two membrane leafs put together with their backside with a permeate spacer in between) are wound around the outer peripheral surface of a central permeate tube. Three of the four edges of the membrane envelope are glued, the fourth one is connected with the central permeate collector. So, in production the permeate water makes a spiral movement from the outside of the membrane module towards the central permeate tube.

In between the windings of membrane envelopes normally one puts a feedwater spacer. The thickness of the feedwater spacer determines the distance between the membrane-envelopes. During operation (filtration) the feedwater is fed on top of the spiral module and can enter the membrane module by the feed spacer. In this way part of the feed water longitudinally flows over the spiral wound type membrane element and is thereafter discharged from a concentrate water outlet (other top side). Meanwhile the main part of the feedwater is transferred into permeate and is collected at the central permeate tube. This is the normal way of operation in Reverse Osmosis and Nanofiltration.

For rendering the spiral membrane technology useful for micro-(MF) and ultrafiltration (UF) operation the spiral membrane should be back-washable (reverse filtration) to be able to remove the deposited particles on top of the membrane surface. During MF/UF operation (filtration) it will work most of the time quite similar to the operation in NF, but yet the continuous concentrate discharge will be drained periodically. This will be performed e.g. after each 30 to 60 minutes by a backwash, with part of the permeate produced during operation and this typically with 2 to 10% of the produced volume. To have an efficient cake removal, this backwash is performed at a flux rate being at least three times higher than the flux rate during operation.

For this purpose a backwashable micro-ultrafiltration membrane is needed. The standard flat-sheet MF/UF membranes are composed of a polymeric membrane cast onto a non-woven type support. These membranes are attached to the support due to physical entrapment/incorporation into the support. This incorporation accounts often for 30% of the thickness of the support structure. Such membranes however are not suitable for backwashing since the adhesion of the membrane to the support is rather poor. Some manufacturers (e.g. Trisep/Nitto Denko) have developed back-washable variants. In these cases the membranes are completely filling up the support structure. This increases the adhesion of the membrane to the support and renders it backwashable to a certain extent.

However, even with this change the adhesion of the membrane to the support/or peel strength are claimed to be 3 fold higher as compared to common UF membrane. The maximum allowable negative TMP during backwashing is still limited to a value of 3 bar.

EP1022052, JP2003251154, JP2002095931, discloses a spiral wound type membrane element and methods of running and washing it. WO0078436 discloses a spiral wound membrane filtration element capable of being back-flushed.

U.S. Pat. No. 5,275,725 discloses a three layer flat membrane support having an inner layer whereon non-woven fabric comprising surface layers are glued with an adhesive or heat fused. On said surface layers, a membrane is applied with a two-sided coating followed by phase inversion.

All these disclosures show the following problems:
Peel strength of the membranes (limited TMP upon back washing)
Laborious module manufacture
Poor particle expulsion power in 6 m pressure vessel (necessity for by-pass spacer)

AIMS OF THE INVENTION

The present invention aims to provide a novel membrane with an integrated permeate channel useable in different membrane applications such as Microfiltration, Ultrafiltration, MBRs, Pervaporation, Membrane distillation, Supported Liquid Membranes, Pertraction, which can be backwashed efficiently and thus is able to withstand high pressure and enable longterm operation without the need for frequent cleaning. The novel membrane should also be economically interesting.

SUMMARY OF THE INVENTION

The present invention concerns an integral permeate channel membrane, comprising a permeate channel consisting of a 3D spacer fabric having an upper and a lower fabric surface, tied together and spaced apart by monofilament threads at a predefined distance, said permeate channel being interposed between two membrane layers, wherein said membrane layers are linked at a multitude of points with said upper and lower fabric surfaces. The fabric surfaces and the monofilaments of the 3D spacer fabric are preferably linked by loops in the monofilament threads. Preferably, said loops are embedded in said membrane layers. Preferably, the fabric surfaces are of a knitted, woven or non-woven type. The distance between the upper and lower fabric surface preferably lies between 0.5 and 10 mm.

The 3D spacer preferably comprises a material selected from the group consisting of polyester, nylon, polyamide, polyphenylene sulphide, polyethylene and polypropylene. The membrane layer preferably comprises a hydrophilic filler material selected from the group consisting of HPC, CMC, PVP, PVPP, PVA, PVAc, PEO, $TiO_2$, $HfO_2$, $Al_2O_3$, $ZrO_2$, $Zr_3(PO_4)_4$, $Y_2O_3$, $SiO_2$, perovskite oxide materials, SiC; and an organic binder material selected from the group consisting of PVC, C-PVC, PSf, PESU, PPS, PU, PVDF, PI, PAN, and their grafted variants.

In a particular embodiment of the present invention, said membrane is planar. The membrane preferably further comprises a sealant at the perimeter of the planar membrane arranged to prevent direct fluid movement from or to the permeate channel without passing through a membrane layer, and an inlet/outlet port connection(s) in fluid connection with the permeate channel, provided at least one edge on the perimeter.

Another embodiment of the present invention consists in a membrane bioreactor module comprising an array of planar membranes of the present invention.

In another particular embodiment of the present invention, said membrane is spirally wound around a central permeate tube.

Another embodiment of the present invention consists in a spiral membrane module, comprising a cylindrically shaped central permeate tube comprising a wall and an inner lumen defined by said wall, and a multitude of spirally wound membranes, wherein the permeate channel of said membranes is in fluid connection with the inner lumen of said central permeate tube and said membranes are spirally wound around said central permeate tube. The spiral membrane module preferably further comprises feed spacers interposed between said membranes. The feed spacer advantageously comprises a planar foil and continuous ribs positioned at both sides of the foil. Further, in a preferred embodiment of the present invention, the spiral membrane module comprises a feed spacer is a by-pass spacer comprising a feed by-pass. The by-pass spacer preferably comprises a planar foil and continuous ribs positioned in a longitudinal direction at both sides of the foil, and wherein the foil comprises a feed by-pass arranged to allow movement of fluids in the longitudinal direction.

The membrane of the present invention can preferably withstand a backwash pressure of at least 10 bar.

Another aspect of the present invention concerns a method for providing a integrated permeate channel membrane, comprising the steps of:
Providing a 3D spacer fabric comprising an upper and lower surface fabric spaced apart by monofilament thread at a predefined distance, and
Applying a membrane layer to said upper and said lower surface fabric.

The step of applying the membrane layers preferably consists of a coating step with a dope and coagulation of said dope to form a membrane layer linked at a multitude of points with said upper and lower fabric surface. The dope advantageously comprises:
a hydrophilic filler material selected from the group consisting of HPC, CMC, PVP, PVPP, PVA, PVAc, PEO, $TiO_2$, $HfO_2$, $Al_2O_3$, $ZrO_2$, $Zr_3(PO_4)_4$, $Y_2O_3$, $SiO_2$, perovskite oxide materials and SiC;

an organic binder material selected from the group consisting of PVC, C-PVC, PSf, PES, PPS, PU, PVDF, PI, PAN and their grafted variants; and a solvent selected from the group consisting of NMP, DMF, DMSO or DMAc or a mixture thereof.

Another aspect of the present invention concerns the use of a membrane or membrane module according to the present invention for water filtration and/or wastewater purification.

DETAILED DESCRIPTION OF THE INVENTION

In the present invention, a novel membrane is presented comprising a permeate channel. This is made possible by the inclusion of a 3D spacer fabric between two membrane layers.

This Integrated Permeate Channel membrane (IPC-membrane) basically comprises the two following constituents:

A 3D-spacer fabric, and

Two membrane layers

Figure 1:
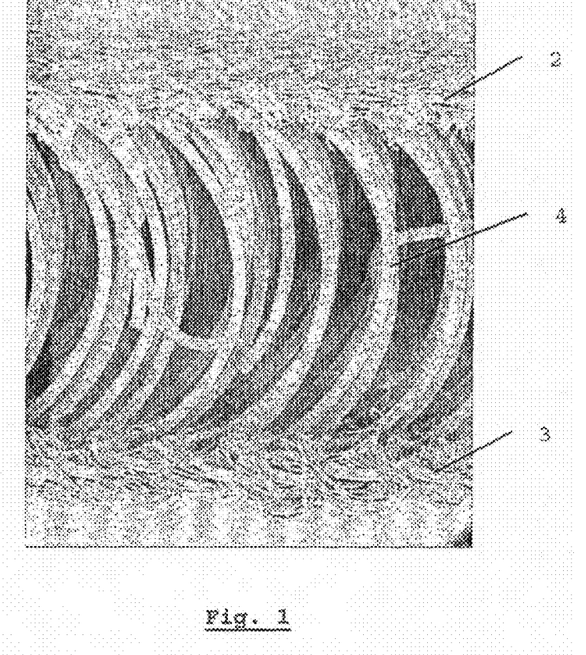
FIG. 1 represents a side view of a 3D spacer fabric.
Figure 2:
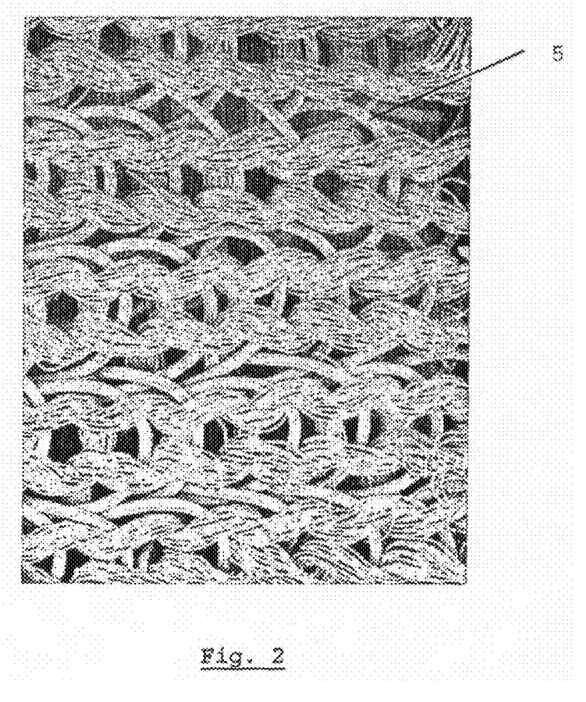
FIG. 2 represents a top surface view of a 3D spacer fabric.
Figure 3:
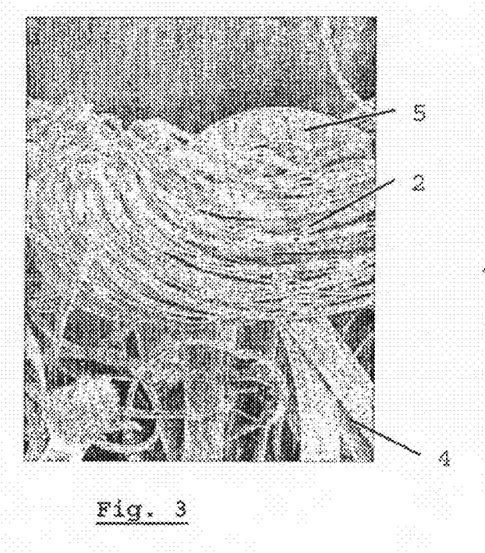
FIG. 3 shows a detail of the connection between upper and lower surface by monofilaments.

The 3D-spacer fabric is preferably made by a knitting operation (e.g. by a Raschel knitting machine). The spacer fabric is composed of two surface fabrics (2, 3) (knitted, woven or non-woven type of fabric) at controllable distance, which are tied together with hundreds of spacer monofilament thread (4) per square cm. An example of such a 3D spacer fabric is shown in FIGS. 1, 2 and 3. The connection between the two fabric surfaces 2 and 3 is made by loops 5 in the spacer monofilament threads 4. The distance between the two surface fabric layers (2,3) is determined by the length of the spacer monofilament threads (4) between the loops (5) and may be varied from 0.5 to 10 mm. The structure of the preferred surface fabrics is shown in FIG. 2.

The most preferable IPC-membrane is made by the coating process. The IPC membrane is formed in-situ by a simultaneous coating of both surfaces (upper and lower, 2 and 3) of the knitted spacer fabric with membrane dope. The membrane is subsequently formed by the phase inversion process (coagulation in non-solvent). The membrane dope may contain any type of polymer binder (natural polymer from the non-limiting series: PVC, C-PVC, PSf, PESU, PPS, PU, PVDF, PI, PAN, and their grafted variants (sulphonated, acrylated, aminated . . . ), an aprotic solvent e.g. DMF, DMSO, DMAc or NMP, and filler material (polymeric like: HPC, CMC, PVP, PVPP, PVA, PVAc, PEO and/or inorganic like: $TiO_2$, $HfO_2$, $Al_2O_3$, $ZrO_2$, $Zr_3(PO_4)_4$, $Y_2O_3$, $SiO_2$, perovskite oxide materials, SiC). The non-solvent may be water vapour phase (water vapour or cold steam), water, or mixtures of water with the mentioned aprotic solvents.

For example, fabrication steps can be:

Spacer fabric preparation step: spacer fabric (knitted, woven or non/woven) unwinding; spacer fabric guiding into vertical position and spacer fabric spreading to prevent fold formation (perpendicular to the fabrication direction)

Spacer fabric coating step: simultaneous double-side coating of dope with a double-sided coating system and automatic dope feeding on both sides of the spacer fabric (same level at both sides) to obtain a dope coated spacer fabric Surface pore formation step: contacting of the double-side coated spacer fabric with water vapour phase. It is also possible to obtain an asymmetric spacer fabric-reinforced membrane with different pore size characteristics at both sides by applying different conditions on both sides of the dope coated spacer fabric.

Bulk formation step: coagulation of product into a hot water bath

Post-treatment step: washing out of chemicals in a water reservoir

Drying step: drying of the product

By this in-situ membrane formation method the constituents (the knitted spacer fabric and the two membrane layers) are unbreakable linked to each other. This is due to the fact that the membrane is formed on top and inside of the spacer fabric itself.

Figure 4:
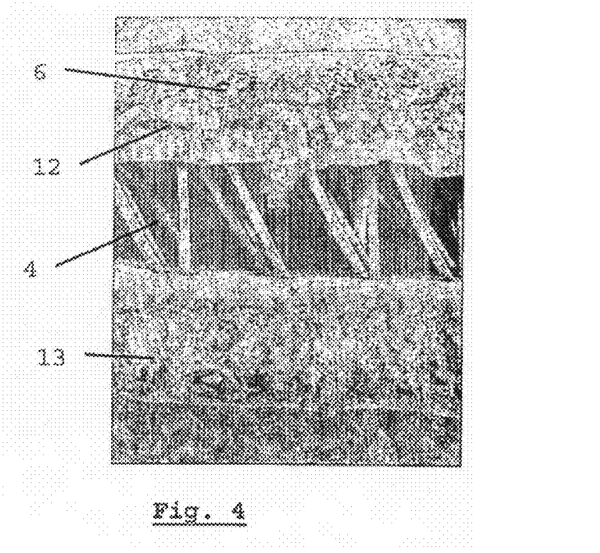
FIG. 4 shows a cross-sectional view (SEM picture) of an IPC-MBR membrane according to the present invention with two membrane layers applied by coating and phase-inversion process.
Figure 5:
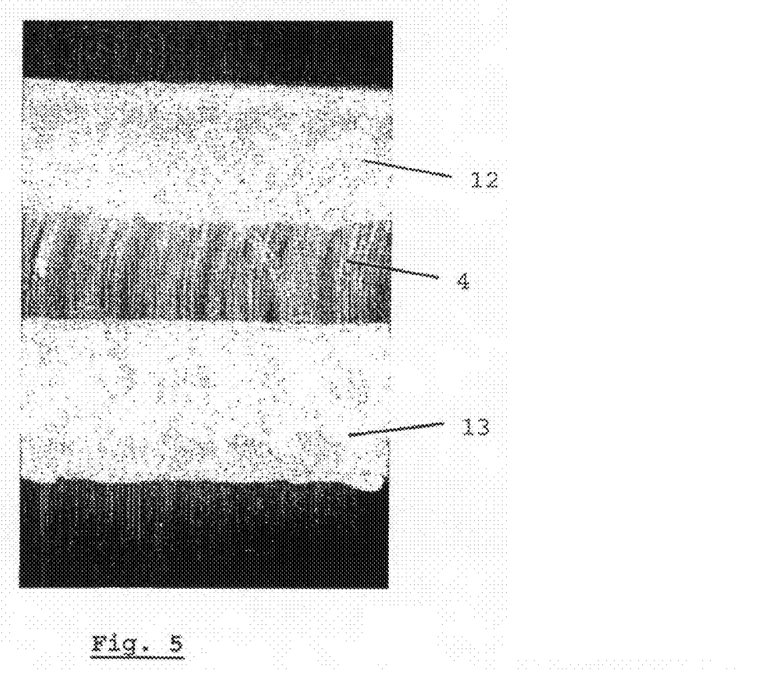
FIG. 5 depicts a cross-sectional view (optical photograph) of an IPC-MBR membrane according to the present invention with two membrane layers applied by coating and phase-inversion process (same membrane as represented in FIG. 4).
Figure 6:
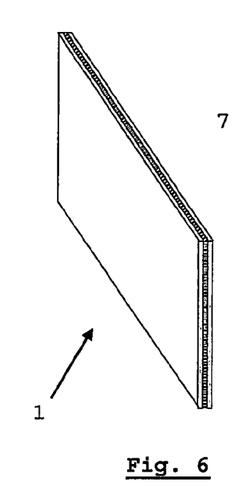
FIG. 6 schematically represents an IPC membrane according to the present invention.

In FIGS. 4, 5 and 6 a typical cross-sectional view is given of an IPC membrane. The monofilament threads 4 are still clearly visible, while both fabric surfaces are now covered with a membrane (12,13)

FIG. 5 is an optical photograph of the cross-section of an IPC-membrane made by phase-inversion process. FIG. 4 is a FESEM picture of the cross-section of the same IPC-membrane as is shown in FIG. 5.

The typical cross-sectional view of the IPC membrane shows the typical components of the IPC membrane:

the multitude of pillars (spacer fabric monofilament threads 4) between the two membrane layers 12 and 13;

the two membrane layers 12 and 13;

the monofilament threads 6 of the two surfaces inside the membrane structure It can also be seen on these cross-sectional views that the loops (5) of the monofilament threads and the multifilaments of the fabric surfaces (3) are embedded in the membrane layers.

From these figures it is clear that the membrane layers are unbreakably linked with the spacer fabric by the multitude of anchorage points.

Properties/Features of the IPC Membrane

One of the key features of the IPC membrane is the presence of an integral permeate channel. This permeate channel is useful for different applications:

For permeate withdrawal in MBR application, as well as for e.g. ultra- and microfiltration, membrane distillation, vapour permeation, pervaporation, and gas separation.

For immobilisation purposes of in e.g. liquid ion-exchanger in supported liquid membranes and in pertraction.

The anchorage/adhesion of the membrane layers of the IPC membrane fabricated by the coating and phase inversion process (see FIG. 5) to the knitted spacer fabric is very strong. This can be explained by the multitude of anchorage points.

This property is illustrated by burst-pressure measurements with silicone oil (having a viscosity of 50 times higher than water). It was found that the two membrane layers do not detach at pressures even up to 17 bar.

This property makes of the IPC-membrane an excellent back-washable flat-sheet (MF/UF) membrane.

Moreover, it was found that the formed composite material structure is also quite rigid. The IPC membrane as a whole is quite rigid after drying. This is rather unexpected considering the flexibility of the spacer fabric itself, due to the loops in the monofilament threads at the surface fabrics. This can be explained by the fixation/incorporation of the monofilament loops of the spacer fabric into the membrane structure of the two membrane layers. This property especially enables to make large surfaces (e.g. 2 m by 2 m).

Hence, the major properties of the IPC membrane according to the present invention are:
- the presence of the integrated spacer channel;
- its back-wash ability;
- its rigidity.

From the aforementioned properties various novel membrane module concepts and applications can be generated with the IPC membrane. The present invention is further illustrated by two non-limiting examples described infra.

Applications:

1. IPC-MBR Membrane Module Concept:

Membrane Bioreactor (MBR) According to the Present Invention:

This novel concept for submerged membrane bioreactor is named IPC-MBR membrane module concept. For this application the integrated permeate channel is used for withdrawing permeate from an active sludge system, without the need for special module concepts with separate permeate spacer channels. The driving force for permeation is a suction force applied from the integrate permeate channel side. By this action water with micro/ultrafiltration quality is generated from the active sludge system.

To enable the suction force on the permeate channel, firstly the so-called "IPC-MBR plates" have to be realized. This is done by closing at least two (preferably opposite) edges of the IPC-MBR membrane 1 (see FIGS. 6 and 7) with sealant 7 such as an epoxy/polyurethane type of resin, or any type of rubber, or a hot melt, or by any type of welding operation. The other edge(s) remain open and is (are) sealed to an inlet/outlet port 8, to enable the permeate to be evacuated or to be fed back. The opposite edges with the inlet/outlet port 8 are then preferably placed into the vertical position (on top), so that gases can be easily evacuated.

Figure 7:
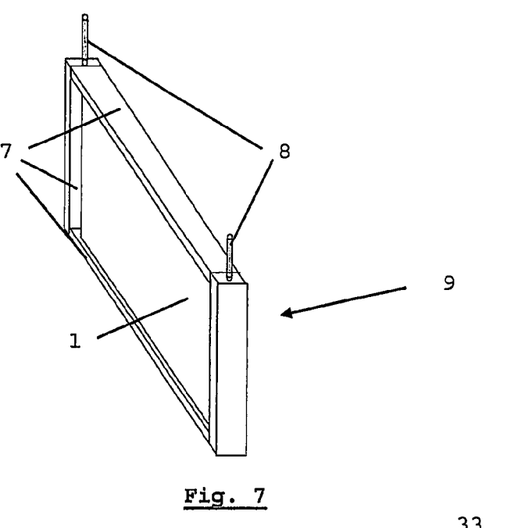
FIG. 7 schematically represents an IPC membrane plate according to the present invention.

The so-formed IPC-MBR plates 9 may have the following dimensions for the purpose of wastewater purification: a width from 0.5 m to up to 2 m; and a height from 0.5 m to up to 2 m To form an MBR module, the IPC-MBR plates 9 are placed vertically in arrays (containing a multitude of these IPC-MBR plates) positioned at a distance of 1 to 10 mm from each other allowing air bubbles to pass the membrane. The IPC-MBR module is now ready for use.

Preferably, an aeration system is placed at the bottom of the module, which serves for cleaning the membranes and for oxygen supply for the bacteria of the active sludge system.

Figure 11:
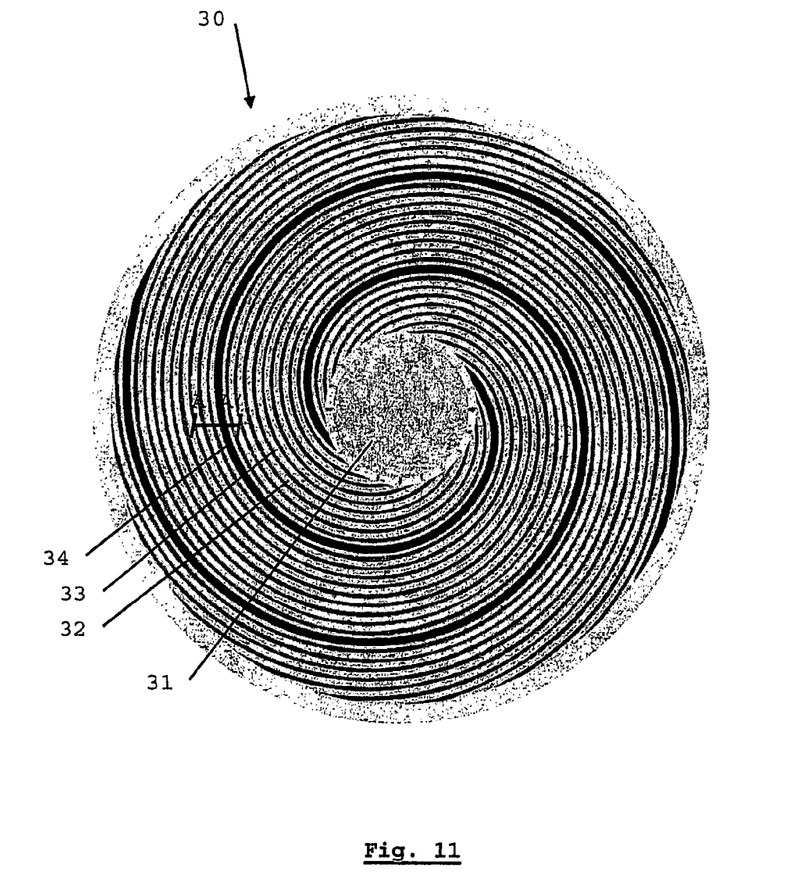
FIG. 11 shows an overview picture of the cross-section of a spiral membrane module.

The constituents of the IPC-MBR module are thus:
- The IPC-membrane plates with at least two closed edges and at least one edge with inlet/outlet ports
- Arrays of these IPC plates
- An optional aeration system at the bottom 2. IPC-Spiral UF Membrane Module Concept:

IPC-Spiral UF Membrane According to the Present Invention:

The IPC membrane sustains back-wash transmembrane pressures (TMP) in operation of above 10 bar, assuring long membrane life. The IPC membranes for this purpose preferably have a thickness in between 1 and 3 mm. In FIG. 11 a schematic drawing is given of the IPC spiral membrane module concept.

The IPC membrane leafs 32 are connected to the central permeate tube 31 just as like the envelope-like membrane types. In the IPC spiral membrane 30 there is no need for a permeate spacer since the distance between the two membrane surfaces is determined by the length of the spacer threads (pillars).

Figure 12:
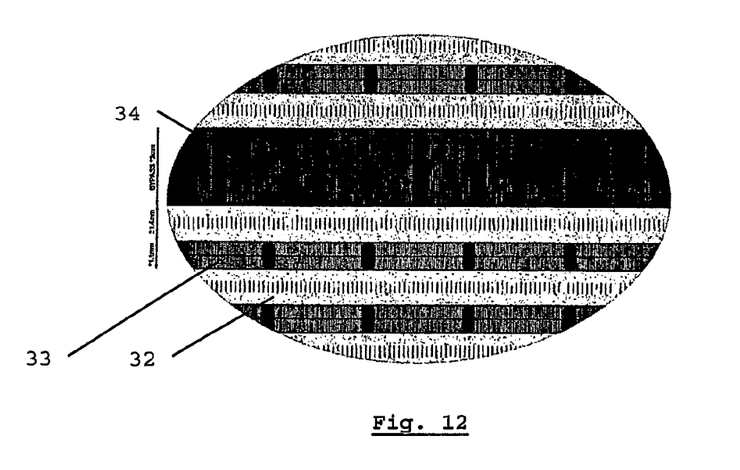
FIG. 12 shows a detail along line A-A' of a spiral membrane.

It is also recommended to use a special feed spacer and to introduce special by-pass spacers. A more detailed view of the IPC spiral UF membrane along the line A-A' is represented in FIG. 13. The arrangement of membranes 32 with integrated permeate channel, feed spacers 33 and by-pass spacers 34 is shown with their respective dimensions for a preferred embodiment of the invention.

Figure 8:
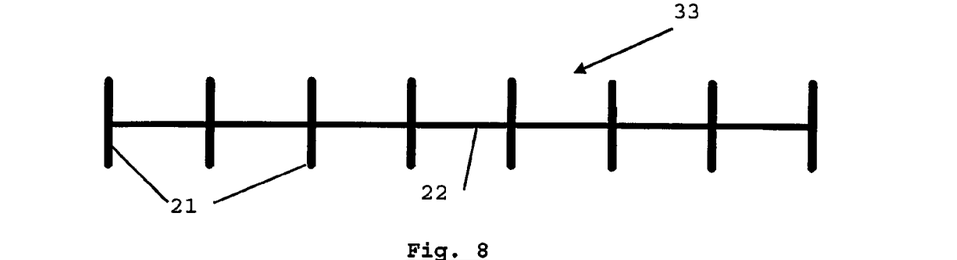
FIG. 8 depicts a schematic representation of a cross-section of a special feed spacer.

The special feed spacer 33 is recommended to enhance the particle expulsion power during backwash operation. This is achieved by guiding the concentrate to the two topsides of the membrane module 30. The spacer consists of massive PE, PP or PES foil 22 with continuous ribs 21 at both sides of the foil. The ribs 21 are in the longitudinal direction of the membrane module. The total thickness of this novel spacer is preferably between 0.5 and 3 mm, the rib height between 0.2 and 1 mm and the foil thickness between 0.05 and 0.3 mm. The distance between the ribs on the foil is preferably between 5 and 30 mm.

Figure 9:
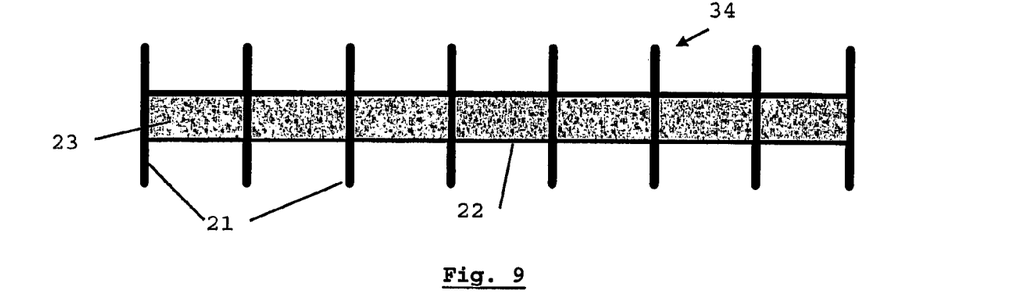
FIG. 9 draws a schematic representation of a cross-section of a special feed spacer with bypasses.

FIGS. 8 and 9 show schematic representations of the special feed spacer

The by-pass spacers 34 are also recommended to enhance the particle expulsion power during backwash operation in bigger modules. In fact it is quite similar to the special feed spacer 33. Moreover it contains a feed by-pass 23 (see FIG. 9).

Figure 10:
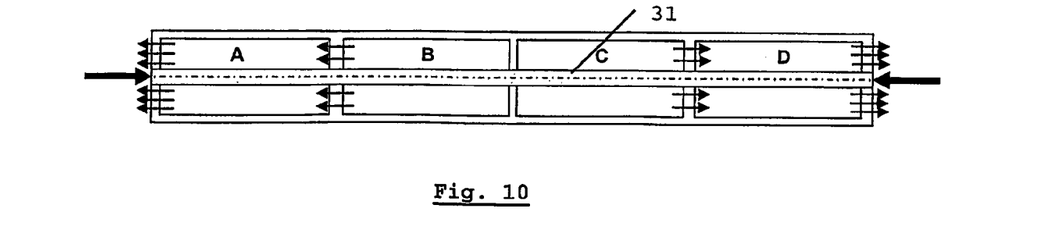
FIG. 10 depicts a schematic representation of 4 spiral IPC membrane modules in a 240 inch long pressure vessel upon back-washing.

The feed by-pass 23 of the by-pass spacer has two functions:
- The first function is to help the particle expulsion during backwash operation. In FIG. 10 a 240 inch long pressure vessel is shown with 4 membrane modules of 60 inches long. Upon backwash the concentrate from modules C has to pass through the feed spacer of modules D, which is being back-washed at the same time. So the by-pass spacer of module D is used for the expulsion of the concentrate from module C. Similar operation for the by-pass spacer of module A for the concentrate of module B.
- The second function is to help to distribute the feed water through all modules of the pressure vessel and especially the modules in the middle upon filtration (modules B and C).

These functions are important for maintaining a stable transmembrane pressure (TMP) over a long period, and for postponing chemical cleaning of the membrane. Due to the low transmembrane pressure in UF and MF membranes, modules are placed hydraulically in parallel to avoid pressure loss.

INDUSTRIAL APPLICATION

Applications for the membranes according to the invention are numerous and include MBR, microfiltration, ultrafiltration, membrane distillation, pervaporation, vapour permeation, gas separation, supported liquid membranes and pertraction.

ABBREVIATIONS

The following abbreviations are used:
HPC: hydroxypropylcellulose
CMC: carboxymethylcellulose
PVP: polyvinylpyrrolidone
PVPP: cross-linked polyvinylpyrrolidone
PVA: polyvinylalcohol
PVAc: polyvinylacetate
PEO: polyethyleneoxide
PVC: polyvinylchloride
C-PVC: chlorinated polyvinylchloride
PSf: polysulphone
PESU: polyethersulfone
PPS: polyphenylene sulphide
PU: polyurethane
PVDF: polyvinylidene fluoride
PI: polyimid
PAN: polyacrylonitrile

The invention claimed is:

1. An integrated permeate channel membrane, comprising a permeate channel including a three-dimensional spacer fabric having an upper and a lower fabric surface tied together and spaced apart by monofilament threads at a predefined distance, wherein the upper and lower fabric surfaces and the monofilament threads of the three-dimensional spacer fabric are tied together by loops made by the monofilament threads, said permeate channel being interposed between two membrane layers, wherein said membrane layers are linked at a multitude of points with said upper and lower fabric surfaces and said loops are embedded in said membrane layers.

2. The membrane according to claim 1, wherein the fabric surfaces are of a knitted, woven or non-woven type.

3. The membrane according to claim 1, wherein the distance between the upper and lower fabric surface lies between 0.5 and 10 mm.

4. The membrane according to claim 1, wherein the three-dimensional spacer comprises a material selected from the group consisting of polyester, nylon, polyamide, polyphenylene sulphide, polyethylene and polypropylene.

5. The membrane according to claim 1, wherein the membrane layers comprises a hydrophilic filler material selected from the group consisting of HPC, CMC, PVP, PVPP, PVA, PVAc, PEO TiO2, HfO2, Al2O3, Zr02, Zr3(PO4)4, Y2O3, SiO2, perovskite oxide materials, SiC; and an organic binder material selected from the group consisting of PVC, C-PVC, PSf, PESU, PPS, PU, PVDF, PI, PAN, and their grafted variants.

6. The membrane according to claim 1, wherein said membrane is planar.

7. The membrane as in claim 6, further comprising a sealant or weld at the perimeter of the planar membrane arranged to prevent direct fluid movement from or to the permeate channel without passing through a membrane layer, and an inlet/outlet port connection in fluid connection with the permeate channel.

8. A membrane bioreactor module comprising an array of membranes as in claim 7.

9. The membrane according to claim 1, wherein said membrane is spirally wound around a central permeate tube.

10. A spiral membrane module, comprising a cylindrically shaped central permeate tube comprising a wall and an inner lumen defined by said wall, and a multitude of membranes according to claim 9, wherein the permeate channel of said membranes is in fluid connection with the inner lumen of said central permeate tube and said membranes are spirally wound around said central permeate tube.

11. The spiral membrane module as in claim 10, further comprising feed spacers interposed between said membranes.

12. The spiral membrane module as in claim 11, wherein the feed spacer comprises a planar foil and continuous ribs positioned at both sides of the foil.

13. The spiral membrane module as in claim 11, wherein a feed spacer is a by-pass spacer comprising a feed by-pass.

14. The spiral membrane module as in claim 13, wherein the by-pass spacer comprises a planar foil and continuous ribs positioned in a longitudinal direction at both sides of the foil, and wherein the foil comprises a feed by-pass arranged to allow movement of fluids in the longitudinal direction.

15. A method of using a membrane or membrane module according to claim 1, comprising filtering water and/or purifying waste water.

16. The membrane as in claim 1 wherein said membrane can withstand a backwash pressure of at least 10 bar.

17. A method of using a membrane according to claim 16 comprising using as membrane bioreactors and/or supported liquid membranes and/or performing microfiltration, ultrafiltration, pervaporation, membrane distillation and/or perstraction.

18. A method of using a membrane according to claim 1 comprising using as membrane bioreactors and/or supported liquid membranes and/or performing microfiltration, ultrafiltration, pervaporation, membrane distillation and/or perstraction.

* * * * *